United States Patent
Muller

(10) Patent No.: US 7,216,562 B2
(45) Date of Patent: May 15, 2007

(54) ELECTRICALLY ADJUSTABLE STEERING COLUMN AND OPERATING METHOD THEREOF

(75) Inventor: Olaf Muller, Russelsheim (DE)

(73) Assignee: Thyssenkrupp Presta AG, Eschen (LI)

( * ) Notice: Subject to any disclaimer, the term of this patent is extended or adjusted under 35 U.S.C. 154(b) by 0 days.

(21) Appl. No.: 11/139,438

(22) Filed: May 27, 2005

(65) Prior Publication Data

US 2005/0268740 A1 Dec. 8, 2005

(30) Foreign Application Priority Data

Jun. 7, 2004 (DE) ............... 20 2004 009 020 U

(51) Int. Cl.
*B62D 1/18* (2006.01)
(52) U.S. Cl. .................. 74/493; 74/495; 280/775
(58) Field of Classification Search .............. 74/494, 74/495, 492, 493, 496; 280/775, 777
See application file for complete search history.

(56) References Cited

U.S. PATENT DOCUMENTS

| | | | | |
|---|---|---|---|---|
| 4,900,059 A | * | 2/1990 | Kinoshita et al. | 280/775 |
| 5,178,411 A | * | 1/1993 | Fevre et al. | 280/775 |
| 5,188,392 A | * | 2/1993 | Sugiki et al. | 280/775 |
| 5,520,416 A | * | 5/1996 | Singer et al. | 280/775 |
| 2002/0124677 A1 | * | 9/2002 | Tomaru et al. | 74/493 |
| 2004/0041388 A1 | * | 3/2004 | Muller | 280/777 |
| 2005/0050979 A1 | * | 3/2005 | Barcat | 74/495 |
| 2005/0199087 A1 | * | 9/2005 | Li et al. | 74/493 |

* cited by examiner

*Primary Examiner*—Richard Ridley
*Assistant Examiner*—James Pilkington
(74) *Attorney, Agent, or Firm*—Martin Fleit; Paul D. Bianco; Fleit Kain Gibbons Gutman Bongini & Bianco P.L.

(57) ABSTRACT

An electrically adjustable steering column includes a steering column servo-drive with a motor in two planes. The steering column is configured so that an inner shaft, mounted in an outer shaft provides for vertical movement or so that the inner shaft accomplishes the lengthwise movement.

18 Claims, 2 Drawing Sheets

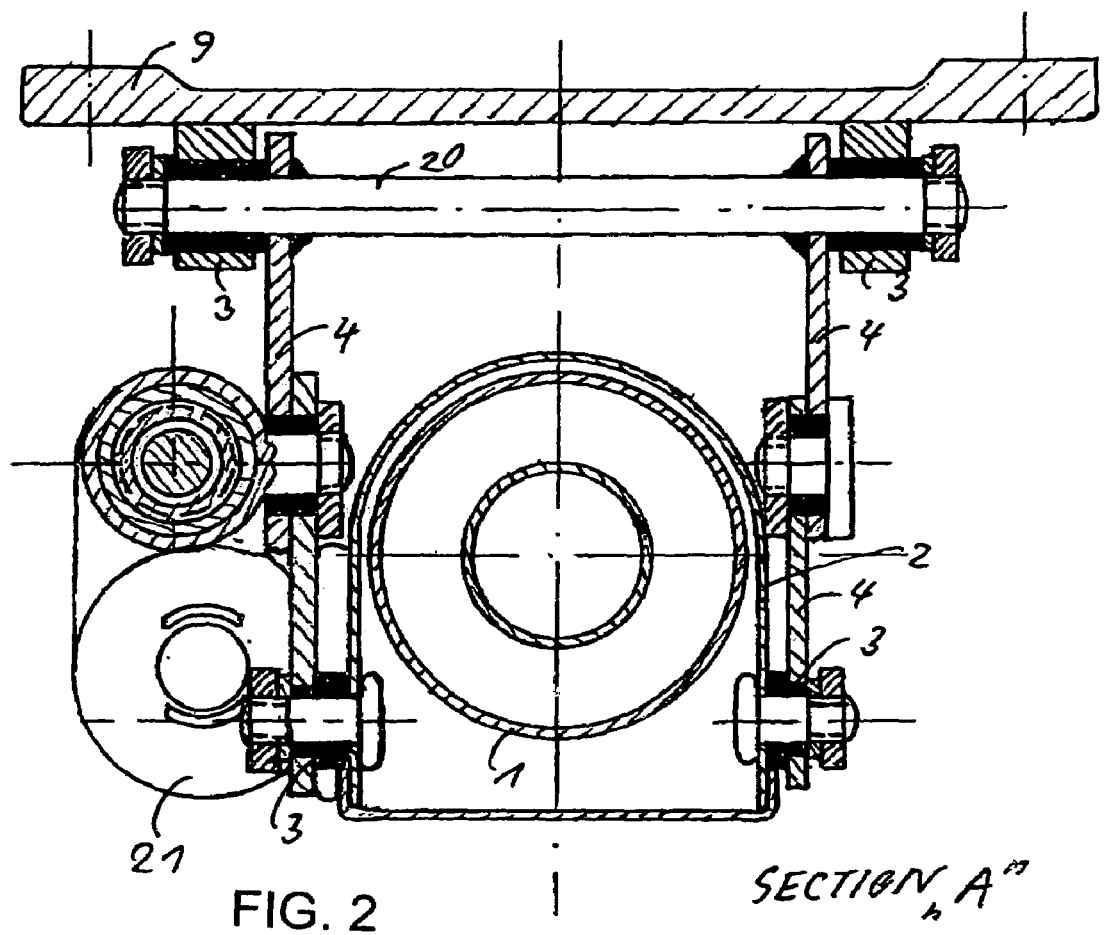
FIG. 2   SECTION A

ELECTRICALLY ADJUSTABLE STEERING COLUMN AND OPERATING METHOD THEREOF

FIELD OF THE INVENTION

The invention concerns an electrically adjustable steering column, especially an electrically adjustable steering column in two planes with a motor, and a method of operation for it.

BACKGROUND OF THE INVENTION

In order to adjust a secure and comfortable position, steering columns of passenger cars are often adjustable in height and length in the prior art. In versions with electrical servo-motors, one motor is customarily used for each direction of adjustment.

Zahnradfabrik Friedrichshafen, based on practical experience, uses one motor and one shaft and employs electromagnets to couple each threaded nut indicating the steering wheel inclination and the forward/backward position.

The Elba company of Bremen, in a steering column with two flexible shafts of the prior art, whose drive unit is switched on and off with a coupling, engages the two directions of adjustment forward or back.

The goal of the present invention, which it achieves, is to improve the existing technique.

Furthermore, the present invention advantageously creates more cost-favorable and simple alternatives with respect to the embodiments of the prior art.

SUMMARY OF THE INVENTION

The present invention creates an electrically adjustable steering column and an operating method for it, configured with a steering column adjustment drive with a motor in two planes, such that one shaft, mounted in the second shaft, preferably provides for the height adjustment, or such that the inner shaft accomplishes the lengthwise adjustment.

In a preferable modification of the invention, the steering column adjustment drive is configured such that both shafts, which can turn but are otherwise stationary, are each provided with a pinion. This can advantageously be modified so that the shaft pinions mesh with pinions of a ratchet mechanism, which accomplishes the vertical or lengthwise movement of a steering column in both directions of turning.

Furthermore, it is preferable to modify the electrically adjustable steering column and its operating method so that a bent lever system is provided for the vertical adjustment and is preferably geometrically configured so that the drive shafts can be fixed stationary on the steering column bearing.

Yet another preferred embodiment of the device and method of the invention consists in a transfer of motion by bent lever to the opposite side, so that a perfectly nonconstrained and "stable" adjustment is achieved.

Benefits of the invention are, in particular, a stable drive system for the steering wheel adjustment, since the shafts are mounted to be stationary, a simple construction, since the shafts are nested one inside the other, the possibility of favorably achieving an advantageous and especially necessary crash resistance, since the two shafts [nested] one inside the other prevent any "buckling,"

an easier mounting of the shafts "nested," than when mounted separately, less room required for the nested shafts, lower weight, and lower costs.

In particular, and advantageously, the present invention thus creates, both in device and in method, a simple system with two threaded spindles, which are stationary and rotate one inside the other, for the lengthwise and vertical adjustment of a steering column with only one motor and one ratchet mechanism.

Preferred and/or advantageous embodiments of the invention result from the claims and combinations thereof, as well as from the overall application documents submitted.

BRIEF DESCRIPTION OF THE FIGURES

FIG. 2 shows in cross section A—A of FIG. 1.

DETAILED DESCRIPTION OF THE INVENTION

Figure 1:
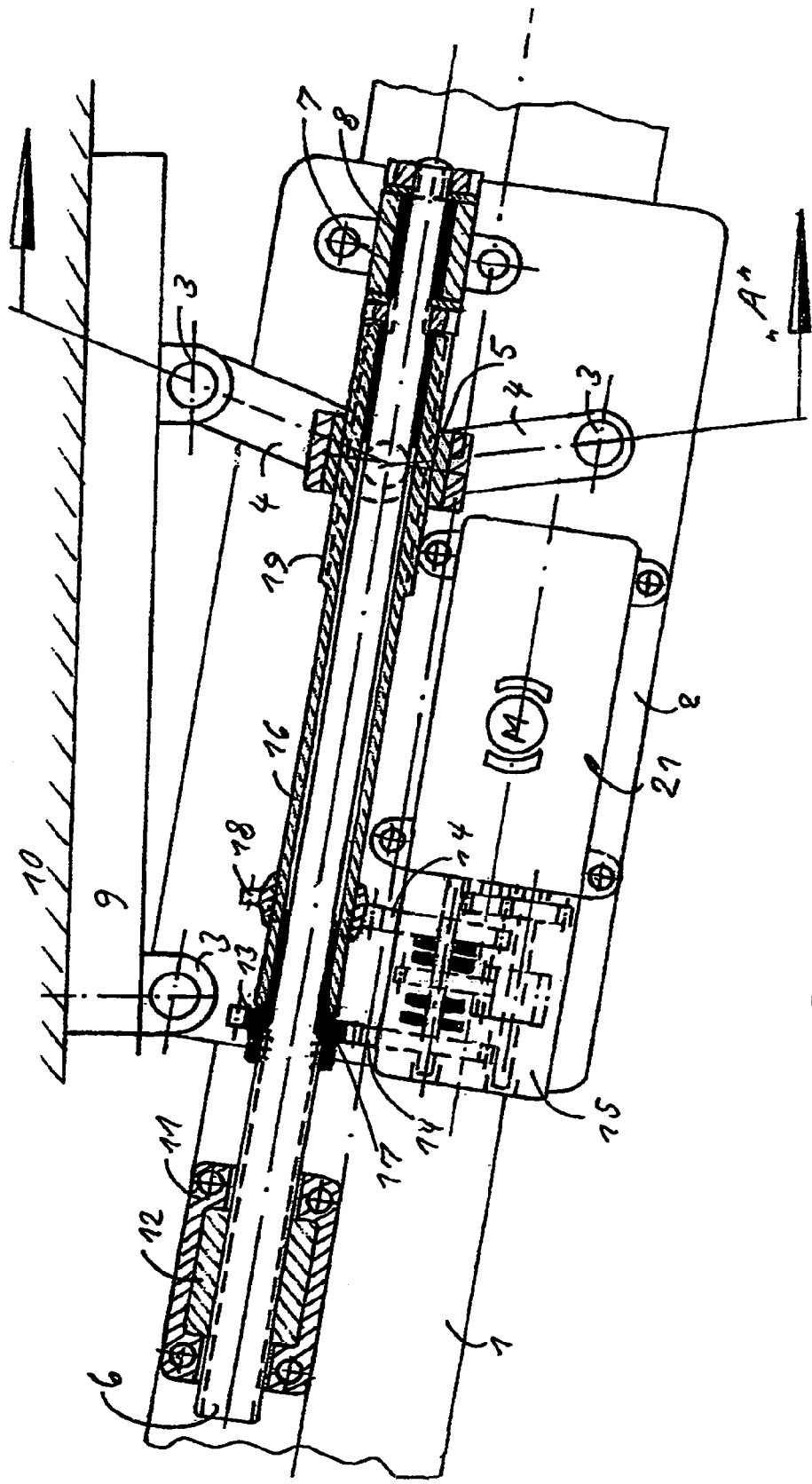
FIG. 1 shows a steering column tube according to the present invention.

The invention shall now be explained more closely by means of sample embodiments, making reference to the drawings.

The invention is only illustrated as an example by means of the embodiment and application examples described hereafter and presented in the drawings. Method and device features shall also appear from the device and method descriptions.

The same reference numbers in the individual figures and images of the drawings designate the same or similar components, or those with the same or similar action. The representations in the drawing also indicate features not provided with reference numbers, whether or not such features are subsequently described. On the other hand, features are also contained in the present description, yet do not appear or are not represented in the drawing, but are easily understandable to a person skilled in the art.

Individual features indicated and/or represented in connection with specific embodiments are not limited to these embodiments or a combination with the other features of these embodiments, but rather can be combined insofar as is technically possible with any other variants, even if not specifically treated in the present documents.

FIG. 1 shows a steering column tube 1, which is mounted in a steering column bearing 2. The steering column bearing 2 is hinged by joints/bearings 3 to a fastening plate 9, so that the steering column bearing 2 can pivot at the forward point and levers 4 are arranged at the rear point, being linked in turn as double bent levers to a nut 5. The fastening plate 9 is secured to the body 10, as usual.

For the adjustment of the steering column tube 1, there is provided a drive shaft 6, which is mounted at one end on the steering column bearing 2 by means of a bearing 8 in a "fixed bearing" 7, so that it can turn but not move lengthwise. This drive shaft 6 is fixed to the steering column tube 1 by means of a pillow block 11, in which a drive nut 12, such as one made from brass, POM, or sintered material, is accommodated. On the drive shaft 6, moreover, there is secured a drive pinion 13, which is powered by a pinion 14 from a ratchet and stepdown gearing mechanism 15.

For the lengthwise adjusting motion, a motor 21 drives the shaft 6 with a pinion 14. Since the drive nut 12 is firmly mounted in the pillow block 11, the steering column tube 1 moves forward or backward according to the direction of turning of the pinion 14.

On the lengthwise adjustment drive shaft 6, a hollow drive shaft 16 is mounted for the vertical adjustment, which can rotate independently. As an alternative, the forward bearing 17 of this drive shaft 16 and the drive pinion 13 can be made from a single piece. On the vertical adjustment drive shaft 16, a drive pinion 18 is secured, which draws its motion from the ratchet and stepdown gearing mechanism 15 depending on the set position and transfers it via a pinion 14.

The vertical adjustment drive shaft 16 has a thread 19 on its outer diameter. This thread 19 turns in the nut 5 and thus moves the bent levers 4, which produce a swivel motion of the steering column bearing 2 by their geometrical arrangement. The lower lever 4 of the bent lever system is secured at the side of the steering column bearing 2, as shown.

FIG. 2 shows in cross section A—A of FIG. 1 the arrangement of the bent levers 4 and their transmission to the other side of the steering column tube 1 by means of an axle 20, on either side of which the pairs of bent levers 4 are secured. The axle 20 is mounted in joints/bearings 3, which are secured to the fastening plate 9.

The shafts 6 and 16, furthermore, can also alternatively and additionally be designed as crash load absorbers in advantageous and preferred manner.

The invention is presented merely as an example by means of the embodiments in the specification and the drawings and is not confined to them, but rather encompasses all variations, modifications, substitutions and combinations that a person skilled in the art will find in the present documents, especially in the context of the claims and the general representations in the introduction to this specification and the description of the embodiments and their representations in the drawings and that he can combine with his technical know-how as well as with the prior art. In particular, every individual feature and possible configuration of the invention and its embodiments can be combined.

LIST OF REFERENCE NUMBERS

1 Steering column tube
2 Steering column bearing
3 Joints/bearings
4 Lever
5 Nut
6 Lengthwise adjustment drive shaft
7 Fixed bearing
8 Bearing
9 Fastening plate
10 Vehicle body
11 Pillow block
12 Drive nut
13 Drive pinion for lengthwise adjustment
14 Pinion
15 Ratchet and stepdown gear mechanism
16 Drive shaft for vertical adjustment
17 Drive shaft bearing
18 Drive pinion for vertical adjustment
19 Vertical adjustment thread
20 Axle

The invention claimed is:

1. Electrically adjustable steering column, comprising:
a motor;
an outer drive shaft connected to the motor; and
an inner drive shaft longitudinally mounted through the outer drive shaft and connected to the motor, wherein the motor provides a rotational movement of the outer drive shaft to control the vertical movement of the adjustable steering column and a rotational movement of the inner drive shaft to control the longitudinal movement of the adjustable steering column.

2. Electrically adjustable steering column according to claim 1, further comprising a bent lever system for the vertical adjustment.

3. Electrically adjustable steering column according to claim 1, further comprising a first drive pinion operably connected to the inner shaft and a second drive pinion operably connected to the outer drive shaft.

4. Electrically adjustable steering column according to claim 3, wherein the first and second pinions are operably connected to the motor, such that an actuation of the second drive pinion controls the vertical movement of the steering column and an actuation of the first drive pinion controls lengthwise movement of the steering column.

5. An electrically adjustable steering column, comprising:
a steering column bearing, wherein the steering column bearing is pivotably mounted to a body;
a steering column tube mounted to the steering column bearing;
a drive shaft including a first end mounted to the steering column bearing and a second end mounted to the steering column tube;
a motor operably connected to the drive shaft such that an actuation of the motor rotates the drive shaft to laterally move the steering column tube with respect to the steering column bearing ; and
a hollow drive shaft mounted to the steering column bearing, wherein the drive shaft is positioned through the hollow drive shaft and the motor is operably connected to the hollow drive shaft such that an actuation of the motor rotates the hollow drive shaft to pivot the steering column bearing with respect to the body.

6. An electrically adjustable steering column according to claim 5 wherein the drive shaft is mounted to the steering column bearing with a fixed bearing, such that the drive shall is longitudinally fixed within the steering column bearing.

7. An electrically adjustable steering column according to claim 5 wherein the first end of the first drive shaft is rotatably mounted to the steering column tube.

8. An electrically adjustable steering column according to claim 5 wherein the hollow drive shaft is rotatably mounted to the steering column bearing, such that the hollow drive shaft is longitudinally fixed within the steering column bearing.

9. An electrically adjustable steering column according to claim 5 further comprising a first drive pinion operably connecting the drive shaft to the motor and a second drive pinion operably connecting the hollow drive shaft to the motor.

10. An electrically adjustable steering column according to claim 9, wherein the first and second pinions are operably connected to the motor, such that an actuation of the first drive pinion controls lengthwise movement of the steering column tube and an actuation of the second drive pinion controls the vertical movement of the steering column tube.

11. An electrically adjustable steering column according to claim 5, wherein the outer diameter of the hollow drive shaft is threaded.

12. An electrically adjustable steering column according to claim 11 further comprising a bent lever system adjustably connecting the steering column bearing to the body.

13. An electrically adjustable steering column according to claim 12 wherein the bent lever system is operably connected to the hollow drive shaft such that a rotation of the hollow drive moved the bent lever system to pivotably adjust the position of the steering column bearing with respect to the body.

14. Operating method for an electrically adjustable steering column, the electrically adjustable steering column including a steering column bearing, wherein the steering column bearing is pivotably mounted to a body; a steering column tube mounted to the steering column bearing; a drive shaft including a first end mounted to the steering column bearing and a second end mounted to the steering column tube; a motor operably connected to the drive shaft such that an actuation of the motor rotates the drive shaft to laterally move the steering column tube with respect to the steering column bearing; and a hollow drive shaft mounted to the steering column bearing, wherein the drive shaft is positioned through the hollow drive shaft and the motor is operably connected to the hollow drive shaft such that an actuation of the motor rotates the hollow drive shaft to pivot the steering column bearing with respect to the body, the method comprising:

adjusting the longitudinal position of the steering column tube; and adjusting the vertical position of the steering column tube.

15. Operating method for an electrically adjustable steering column according to claim 14, wherein the electrically adjustable steering column further includes a first drive pinion operably connected to the drive shaft and a second drive pinion operably connected to the hollow drive shaft.

16. Operating method for an electrically adjustable steering column according to claim 15, wherein the first and second pinions are operably connected to the motor, such that an actuation of the second drive pinion controls the vertical movement of the steering column tube and an actuation of the first drive pinion controls lengthwise movement of the steering column tube.

17. Operating method for an electrically adjustable steering column according to claim 14, wherein the electrically adjustable steering column further includes a bent lever system adjustably connecting the steering column bearing to the body.

18. Operating method for an electrically adjustable steering column according to claim 17, wherein the bent lever system operably connected to the hollow drive shaft such that a rotation of the hollow drive shaft moves the bent lever system to pivotably adjust the position of the steering column bearing with respect to the body.

* * * * *